US010539228B2

(12) United States Patent
Ishiguro et al.

(10) Patent No.: US 10,539,228 B2
(45) Date of Patent: Jan. 21, 2020

(54) TRAVEL CONTROL DEVICE, AND TRAVEL CONTROL METHOD

(71) Applicant: ISUZU MOTORS LIMITED, Tokyo (JP)

(72) Inventors: Shinichi Ishiguro, Kawasaki (JP); Nobuyuki Nishimura, Yokohama (JP); Masao Nishikimi, Machida (JP)

(73) Assignee: ISUZU MOTORS LIMITED, Tokyo (JP)

(*) Notice: Subject to any disclaimer, the term of this patent is extended or adjusted under 35 U.S.C. 154(b) by 81 days.

(21) Appl. No.: 15/561,242

(22) PCT Filed: Mar. 18, 2016

(86) PCT No.: PCT/JP2016/058628
§ 371 (c)(1),
(2) Date: Sep. 25, 2017

(87) PCT Pub. No.: WO2016/152749
PCT Pub. Date: Sep. 29, 2016

(65) Prior Publication Data
US 2018/0058574 A1  Mar. 1, 2018

(30) Foreign Application Priority Data
Mar. 26, 2015  (JP) ................. 2015-064243

(51) Int. Cl.
*F16H 61/02* (2006.01)
*F16H 59/18* (2006.01)
(Continued)

(52) U.S. Cl.
CPC ......... *F16H 61/0213* (2013.01); *F16H 59/18* (2013.01); *F16H 59/44* (2013.01);
(Continued)

(58) Field of Classification Search
None
See application file for complete search history.

(56) References Cited

U.S. PATENT DOCUMENTS 4,852,006 A * 7/1989 Speranza ............... B60W 10/06
                                                   701/55
5,592,851 A * 1/1997 Bates .................. F16H 61/0248
                                                   477/108
(Continued)

FOREIGN PATENT DOCUMENTS

DE  102006001818 A1  7/2007
DE  102010005045 A1  7/2011
(Continued)

OTHER PUBLICATIONS

MercedesTruckUK, "Mercedes Actros Predivtive Tempomat", May 20, 2013, XP054978015, Retrieved from the Internet: URL:https://www.youtube.com/watch?v=9EAEp25Jcho [retrieved on Jan. 12, 2018].

(Continued)

*Primary Examiner* — Colby M Hansen
(74) *Attorney, Agent, or Firm* — Brundidge & Stanger, P.C.

(57) ABSTRACT

In the present invention: a road information acquisition unit (12a) acquires road information about a prescribed section of road ahead of a vehicle traveling at a first shift position; a vehicle information acquisition unit (12b) acquires vehicle information; a speed prediction unit (12c) predicts, on the basis of the road information and the vehicle information, the speed transition in the prescribed section for when the vehicle will have traveled through the prescribed section at the first shift position; and a gearshift control unit (12d) causes a transmission (5) to downshift to a second shift (Continued)

position when the minimum value of the predicted vehicle speed is less than a prescribed speed.

3 Claims, 4 Drawing Sheets

(51) Int. Cl.
F16H 59/44 (2006.01)
F16H 59/66 (2006.01)
F16H 59/70 (2006.01)

(52) U.S. Cl.
CPC ........ *F16H 59/66* (2013.01); *B60Y 2300/143* (2013.01); *F16H 59/70* (2013.01); *F16H 2059/663* (2013.01); *F16H 2059/666* (2013.01)

(56) References Cited

U.S. PATENT DOCUMENTS

| | | | | |
|---|---|---|---|---|
| 5,931,886 A | * | 8/1999 | Moroto | F16H 61/0213 701/533 |
| 6,106,434 A | | 8/2000 | Ibamoto et al. | |
| 2001/0032044 A1 | * | 10/2001 | Hanawa | F16H 61/0213 701/51 |
| 2009/0118949 A1 | * | 5/2009 | Heap | B60W 10/06 701/55 |
| 2014/0200788 A1 | | 7/2014 | Eriksson et al. | |

FOREIGN PATENT DOCUMENTS

| | | |
|---|---|---|
| JP | 07-042820 A | 2/1995 |
| JP | 09-166205 A | 6/1997 |
| JP | 2000-314473 A | 11/2000 |
| JP | 2006-098407 A | 4/2006 |
| JP | 2009-115270 A | 5/2009 |
| JP | 2013-130239 A | 7/2013 |
| WO | 2013/034161 A1 | 3/2013 |

OTHER PUBLICATIONS

Extended European Search Report dated Jan. 23, 2018 for European Patent Application No. 16768652.6.

International Search Report from International Application No. PCT/JP2016/058628 dated Jun. 21, 2016.

Office Action dated Feb. 8, 2019 for European Patent Application No. 16768652.6.

* cited by examiner ical Field

TRAVEL CONTROL DEVICE, AND TRAVEL CONTROL METHOD

TECHNICAL FIELD

The present invention relates to a travel control device and a travel control method for controlling a transmission to perform a downshift from a first transmission gear to a second transmission gear when the vehicle speed is lower than a predetermined speed.

BACKGROUND ART

Conventionally, automatic transmissions for automatically switching a transmission gear in accordance with the speed of a vehicle (vehicle speed), the accelerator operation by the driver, and the like are used in vehicles such as automobiles.

For example, PTL 1 discloses a transmission control device in which a target transmission gear of an automatic transmission is set based on the vehicle speed and the amount of the accelerator operated by the driver in accordance with a shift map set in advance, and the transmission control of the automatic transmission is performed based on the target transmission gear.

In this transmission control device, when it is determined that an upslope road is included in a predetermined distance range on the course of the vehicle based on the map information, the target transmission gear is set to a transmission gear lower than the present transmission gear of the vehicle traveling on the flat road before the vehicle reaches the upslope road. This configuration aims to avoid degradation of travel feeling due to significant reduction in speed on the upslope road.

CITATION LIST

Patent Literature

PTL 1
Japanese Patent Application Laid-Open No. 2013-130239

SUMMARY OF INVENTION

Technical Problem

In the above-described in PTL 1, however, the transmission gear is changed to a transmission gear lower than the present transmission gear before the vehicle reaches the upslope road even when the vehicle can go up the upslope road with the present transmission gear, and consequently, in the case where the upslope road is long and the like, fuel economy is poor, and moreover, the time period until the vehicle reaches the crest is long.

To solve the above-mentioned problems, an object of the present invention is to provide a control device and a travel control method which can prevent reduction of the vehicle speed, prevent degradation of fuel economy, and reduce the period until the vehicle reaches the crest with a good balance when the vehicle travels on the upslope road.

Solution to Problem

To solve the above-mentioned problems, a travel control device of an embodiment of the present invention controls a transmission to perform a downshift from a first transmission gear to a second transmission gear when a vehicle speed is lower than a predetermined speed, the travel control device including: a road information acquiring section that acquires information about a road in a predetermined section ahead of a vehicle travelling with the first transmission gear; a vehicle information acquiring section that acquires information about the vehicle; a speed estimating section that estimates, based on the information about the road and the information about the vehicle, a transition of a vehicle speed in the predetermined section in a case where the vehicle travels in the predetermined section with the first transmission gear; and a transmission control section that controls the transmission to perform the downshift when a minimum value of the transition of the vehicle speed estimated by the speed estimating section is smaller than the predetermined speed.

A travel control method of an embodiment of the present invention is a method for controlling a transmission to perform a downshift from a first transmission gear to a second transmission gear when a vehicle speed is lower than a predetermined speed, the method including: acquiring information about a road in a predetermined section ahead of a vehicle travelling with the first transmission gear; acquiring information about the vehicle; estimating based on the information about the road and the information about the vehicle a transition of a vehicle speed in the predetermined section in a case where the vehicle travels in the predetermined section with the first transmission gear; and controlling the transmission to perform the downshift when a minimum value of the transition of the vehicle speed estimated by the estimating is smaller than the predetermined speed.

Advantageous Effects of Invention

According to the present invention, it is possible to achieve prevention of reduction of the vehicle speed, prevention of degradation of fuel economy, and reduction of the period until the vehicle reaches the crest with a good balance when the vehicle travels on the upslope road.

DESCRIPTION OF EMBODIMENTS

Figure 1:
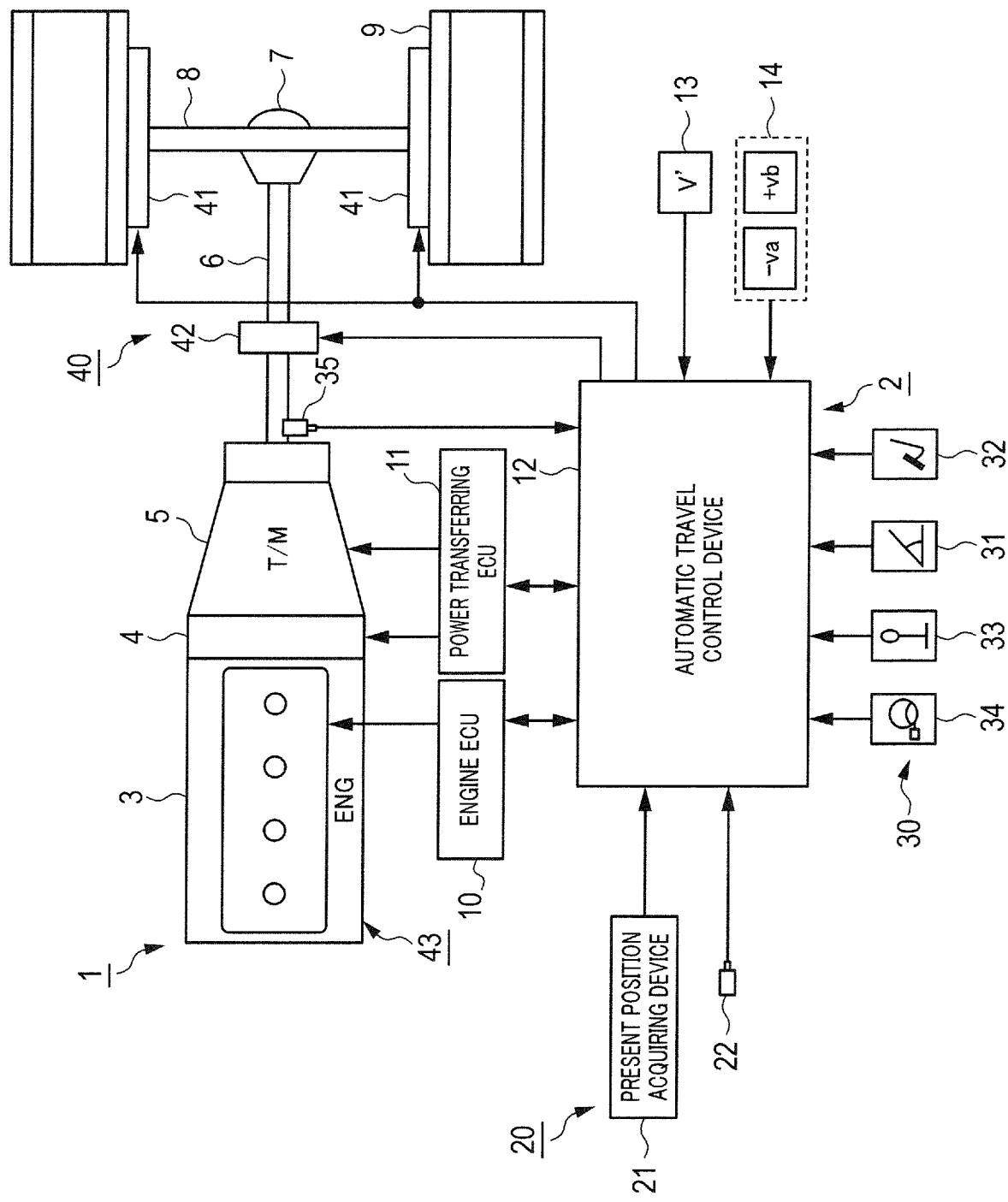
FIG. 1 is a block diagram illustrating an example configuration of an automatic travel device according to an embodiment of the present invention.
Figure 2:
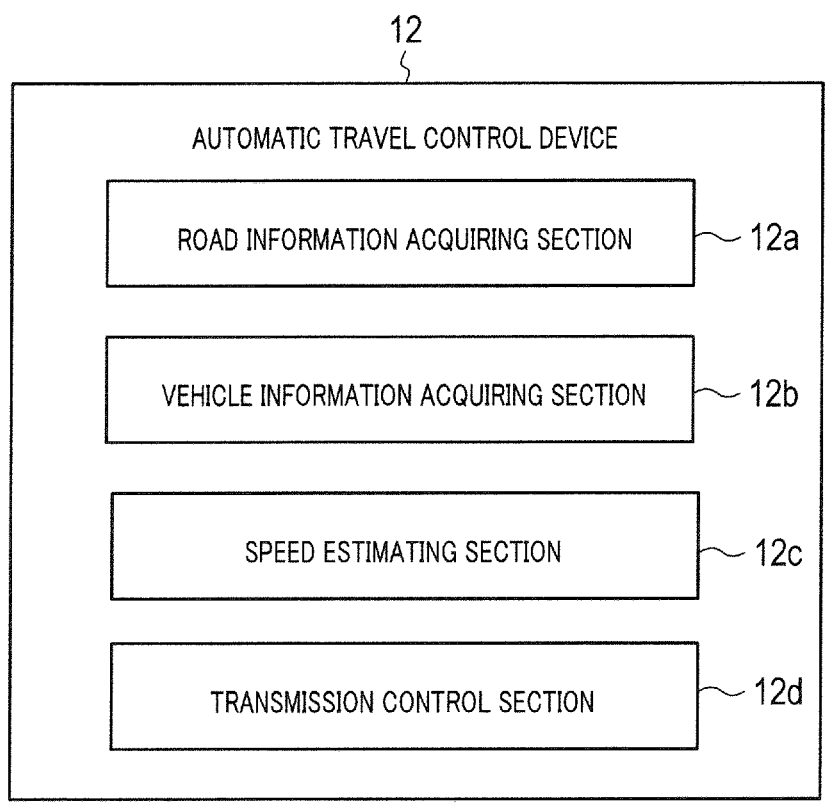
FIG. 2 is a block diagram illustrating an example configuration of an automatic travel control device illustrated in FIG. 1.

An embodiment of the present invention is described below with reference to the accompanying drawings. FIG. 1 is a block diagram illustrating an example configuration of automatic traveling device 2 according to the embodiment of the present invention. In addition, FIG. 2 is a block diagram illustrating an example configuration of automatic travel control device 12 illustrated in FIG. 1.

It is to be noted that, while engine 3 is an in-line six-cylinder diesel engine in FIG. 1, the present invention is applicable also to a gasoline engine, and the arrangement and the number of the cylinders are not limited. In addition, while vehicle 1 is a large vehicle such as a truck in which a diesel engine is mounted in the following description, the present invention is not limited to large vehicles such as trucks.

As illustrated in FIG. 1, in vehicle 1 in which automatic traveling device 2 of the present embodiment is mounted, the power of engine 3 is transmitted to transmission 5 via clutch 4, and transmitted from transmission 5 to differential gear 7 through a propeller shaft 6, and further, transmitted from differential gear 7 to wheel 9 through drive shaft 8. In this manner, the power of engine 3 is transmitted to wheel 9, and thus vehicle 1 travels.

Automatic traveling device 2 of the present embodiment controls the output of engine 3, the connection and disconnection of clutch 4, and the transmission of transmission 5 for automatic travel of vehicle 1. Automatic traveling device 2 includes a plurality of control devices.

To be more specific, automatic traveling device 2 includes control engine ECU (engine control unit) 10 that controls the output of engine 3, power transferring ECU (power transferring control unit) 11 that controls the connection and disconnection of clutch 4 and the transmission of transmission 5, and automatic travel control device 12 that controls the automatic travel of vehicle 1.

Each of engine ECU 10, power transferring ECU 11, and automatic travel control device 12 is composed of a micro controller. Engine ECU 10, power transferring ECU 11, and automatic travel control device 12 are connected with one another with an in-vehicle network, and required data and control signals are exchanged therebetween.

In addition, automatic traveling device 2 includes, at a dashboard of a driver's seat not illustrated, target-vehicle speed setting device 13 and increment/reduction value setting device 14, and target-vehicle speed setting device 13 and increment/reduction value setting device 14 are connected with automatic travel control device 12.

Target-vehicle speed setting device 13 is a device that is manually operated by the driver before the automatic travel of vehicle 1 is started, to set target-vehicle speed V' [km/h] of vehicle 1 in the automatic travel. When target-vehicle speed V' is set in target-vehicle speed setting device 13 by the driver, the target-vehicle speed V' is transmitted to automatic travel control device 12, and stored in a storage device of automatic travel control device 12.

Increment/reduction value setting device 14 is a device that is operated by the driver before the automatic travel of vehicle 1 is started and after target-vehicle speed V is set, to set both speed reduction value −va [km/h] and speed increment value +vb [km/h] of vehicle 1 in the automatic travel.

When both speed reduction value −va and speed increment value +vb are set in increment/reduction value setting device 14 by the driver, speed reduction value −va and speed increment value +vb are transmitted to automatic travel control device 12, and stored in a storage device of automatic travel control device 12.

In addition, automatic travel control device 12 adds speed reduction value −va and speed increment value +vb to target-vehicle speed V to calculate lower limit target-vehicle speed Va' [km/h] and upper limit target-vehicle speed Vb' [km/h], and stores the calculated values in the storage device of automatic travel control device 12.

For example, in the case where target-vehicle speed V' is 80 km/h, speed reduction value −va is −5 km/h, and speed increment value +vb is +10 km/h, lower limit target-vehicle speed Va' is 75 km/h and upper limit target-vehicle speed Vb' is 90 km/h. It is to be noted that speed reduction value −va and speed increment value +vb may be set to zero.

Lower limit target-vehicle speed Va' and upper limit target-vehicle speed Vb' define a range of vehicle speed V [km/h] which can be accepted by the driver in the automatic travel of vehicle 1.

In addition, road information acquiring device 20 is a device for acquiring road information about the road ahead. The road ahead is the road extending from the present position of the vehicle in the travelling direction of the vehicle.

For example, road information acquiring device 20 includes present position acquiring device 21 that is a receiver of a global positioning system (GPS), and periphery sensor 22 that detects the distance from vehicles around the travelling vehicle such as a vehicle travelling ahead and/or a vehicle travelling on a side, and the difference in vehicle speed from vehicles around the travelling vehicle.

Vehicle information acquiring device 30 is a device for acquiring vehicle information of vehicle 1. For example, vehicle information acquiring device 30 includes accelerator sensor 31 that detects the pressing amount of the accelerator pedal, brake switch 32 that detects the presence/absence of the pressing of the brake pedal, shift lever 33, turn-signal switch 34, and vehicle speed sensor 35 that detects vehicle speed V of vehicle 1. In addition, engine ECU 10 and power transferring ECU 11 are also included in vehicle information acquiring device 30.

Braking device 40 is a device for applying a braking force to vehicle 1. Braking device 40 includes foot brake 41, retarder 42, and auxiliary brake 43 such as an exhaust brake that is controlled with engine ECU 10 and/or power transferring ECU 11.

As illustrated in FIG. 2, automatic travel control device 12 includes road information acquiring section 12a, vehicle information acquiring section 12b, speed estimating section 12c, and transmission control section 12d.

Road information acquiring section 12a acquires road information in a predetermined section ahead of the present point of vehicle 1.

To be more specific, road information acquiring section 12a determines the road ahead based on the present position acquired by present position acquiring device 21, map data stored in advance and the like, and acquires information about the road grade in a predetermined section of the acquired road ahead, the curve in the predetermined section of the road ahead, the presence/absence of traffic lights and the like. In addition, road information acquiring section 12a acquires information about the distance and the difference in vehicle speed from other travelling vehicles around the vehicle and the like, which is detected by periphery sensor 22.

It is to be noted that road information acquiring section 12a may determine the predetermined section in accordance with the speed of vehicle 1. For example, road information acquiring section 12a may calculate a distance based on the product of the present vehicle speed and a predetermined time, and may set, as the predetermined section, a section corresponding to the distance from the present point of vehicle 1 in the road ahead.

Vehicle information acquiring section 12b acquires vehicle information required for the automatic travel of vehicle 1.

To be more specific, vehicle information acquiring section 12b acquires information about the pressing amount of the accelerator pedal detected by accelerator sensor 31, the presence/absence of the pressing of the brake pedal detected by brake switch 32, the operation of shift lever 33 and/or turn-signal switch 34, vehicle speed V of vehicle 1 detected by vehicle speed sensor 35, the output of engine 3 used in engine ECU 10 and power transferring ECU 11, the weight of vehicle 1, the transmission gear of transmission 5 and the like.

It is to be noted that the information acquired by road information acquiring section 12a and vehicle information acquiring section 12b is not limited to the above-mentioned information, and other information required for the automatic travel of vehicle 1 may be acquired. In addition, the devices provided in road information acquiring device 20 and/or vehicle information acquiring device 30 may be changed or additionally provided in accordance with the information to be acquired.

On the basis of the road information and the vehicle information, speed estimating section 12c estimates the transition of the vehicle speed in the predetermined section of the case where vehicle 1 travels in the predetermined section of the road ahead with the present transmission gear and the maximum accelerator opening. The method of estimating the transition of the vehicle speed with speed estimating section 12c is described in detail later.

Transmission control section 12d controls the transmission operation of transmission 5 through power transferring ECU 11.

To be more specific, transmission control section 12d stores a shift map in which the relationship among the vehicle speed, the pressing amount of the accelerator pedal, and the transmission gear is defined. Transmission control section 12d refers to the shift map and acquires information about the transmission gear corresponding to the present vehicle speed acquired by vehicle information acquiring section 12b and the pressing amount of the accelerator pedal detected by accelerator sensor 31, to thereby determine whether to change the present transmission gear.

When transmission control section 12d determines that the transmission gear is to be changed, transmission control section 12d sends to power transferring ECU 11 a request for changing the transmission gear.

It is to be noted that, in place of transmission control section 12d, power transferring ECU 11 may store the shift map and control the transmission gear based on the shift map.

Further, when the minimum value of the vehicle speed in the predetermined section estimated by speed estimating section 12c is smaller than a vehicle speed set in advance in the shift map as a vehicle speed that requires downshift (hereinafter referred to as "downshift vehicle speed"), transmission control section 12d transmits to power transferring ECU 11 a request of a downshift. Thus transmission control section 12d controls transmission 5 to perform a downshift.

When the above-mentioned minimum value is not smaller than the downshift vehicle speed, transmission control section 12d does not control transmission 5 to perform a downshift.

With this configuration, a downshift is performed only when a downshift is required, and therefore degradation of fuel economy can be prevented while achieving prevention of reduction of the vehicle speed, prevention of degradation of fuel economy, and reduction of the period until the vehicle reaches the crest with a good balance.

Next, the method of estimating the vehicle speed with speed estimating section 12c is described. When the present vehicle speed is represented by $V_n$ [km/h], and the estimated vehicle speed at a position ahead by L [m] is represented by $V_{n+1}$ [km/h], the relationship between $V_n$ and $V_{n+1}$ is expressed by the following Expression (1).

[Expression 1]

$$V_{n+1} = V_n + \Delta V_n \qquad (1)$$

Here, $\Delta V_n$ [km/h] is calculated with the following Expression (2).

[Expression 2]

$$\Delta V_n = 3.6^2 \times (G - \theta/100) \times 9.81 \times L/V_n \qquad (2)$$

Here, $\theta$ [%] is an average road grade from the present position to a position ahead of the present position by L. The average road grade is calculated from the above-described map data.

In addition, G [km/h$^2$] is the acceleration of the case where the vehicle travels with the present transmission gear and the maximum accelerator opening, and is calculated with the following Expression (3).

[Expression 3]

$$G = [tq \cdot rt \cdot rf \cdot \eta/tr - \{(M \cdot rrc) + (arc \cdot V_n^2)\}]/M \qquad (3)$$

Here, tq [kgf·m] is the maximum torque of engine 3 of the case where the vehicle travels with the present transmission gear at vehicle speed $V_n$, rt the gear ratio of the present transmission gear, rf the gear ratio of the final gear, $\eta$ the transmission efficiency, tr [m] the tire radius, M [kg] the vehicle weight, rrc the roll resistance coefficient, and arc [kgf/(km/h)$^2$] the air resistance coefficient. These pieces of information are included in the vehicle information that is acquired by vehicle information acquiring section 12b.

By use of Expressions (1) to (3), speed estimating section 12c can estimate vehicle speed $V_m$ of a position ahead of the present position by mL (m=1, 2, . . . ) with the present vehicle speed $V_0$ as the initial value.

Figure 3:
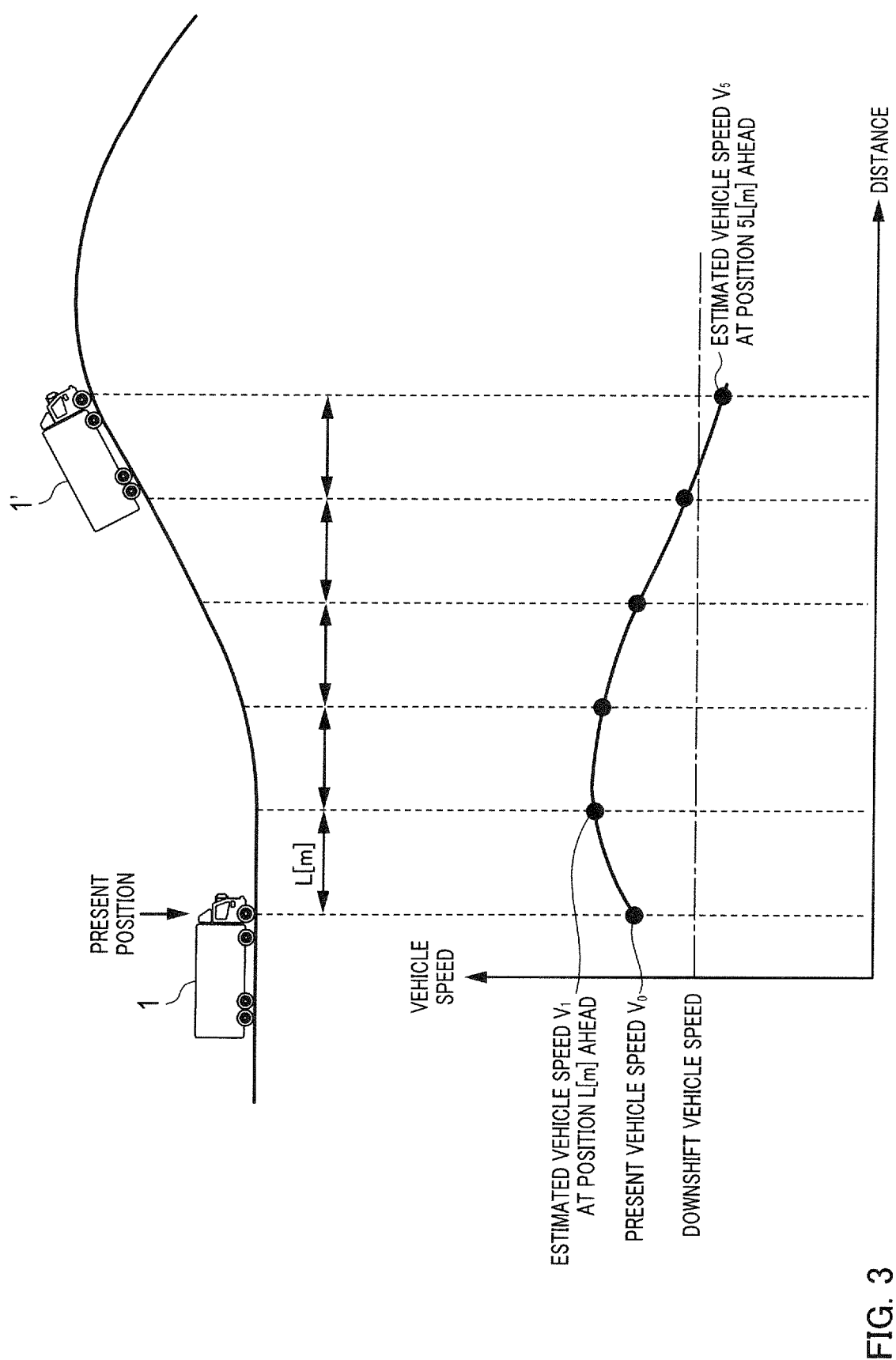
FIG. 3 illustrates an example process of determining the necessity of a downshift according to the embodiment of the present invention.

Next, an example process of determining the necessity of a downshift according to the embodiment of the present invention is described. FIG. 3 illustrates an example process of determining the necessity of a downshift according to the embodiment of the present invention.

FIG. 3 illustrates vehicle 1 travelling on a flat road, and vehicle 1' travelling on an upslope road ahead of the upslope road by 5L. In addition, the graph of FIG. 3 shows a transition of an estimated vehicle speed.

In the case of FIG. 3, transmission control section 12d determines that vehicle speed $V_5$ is lower than the downshift vehicle speed, and controls transmission 5 to perform a downshift from the present transmission gear to a transmission gear lower than the present transmission gear by one gear at the present position of the vehicle, that is, at a positon on the flat road.

Figure 4:
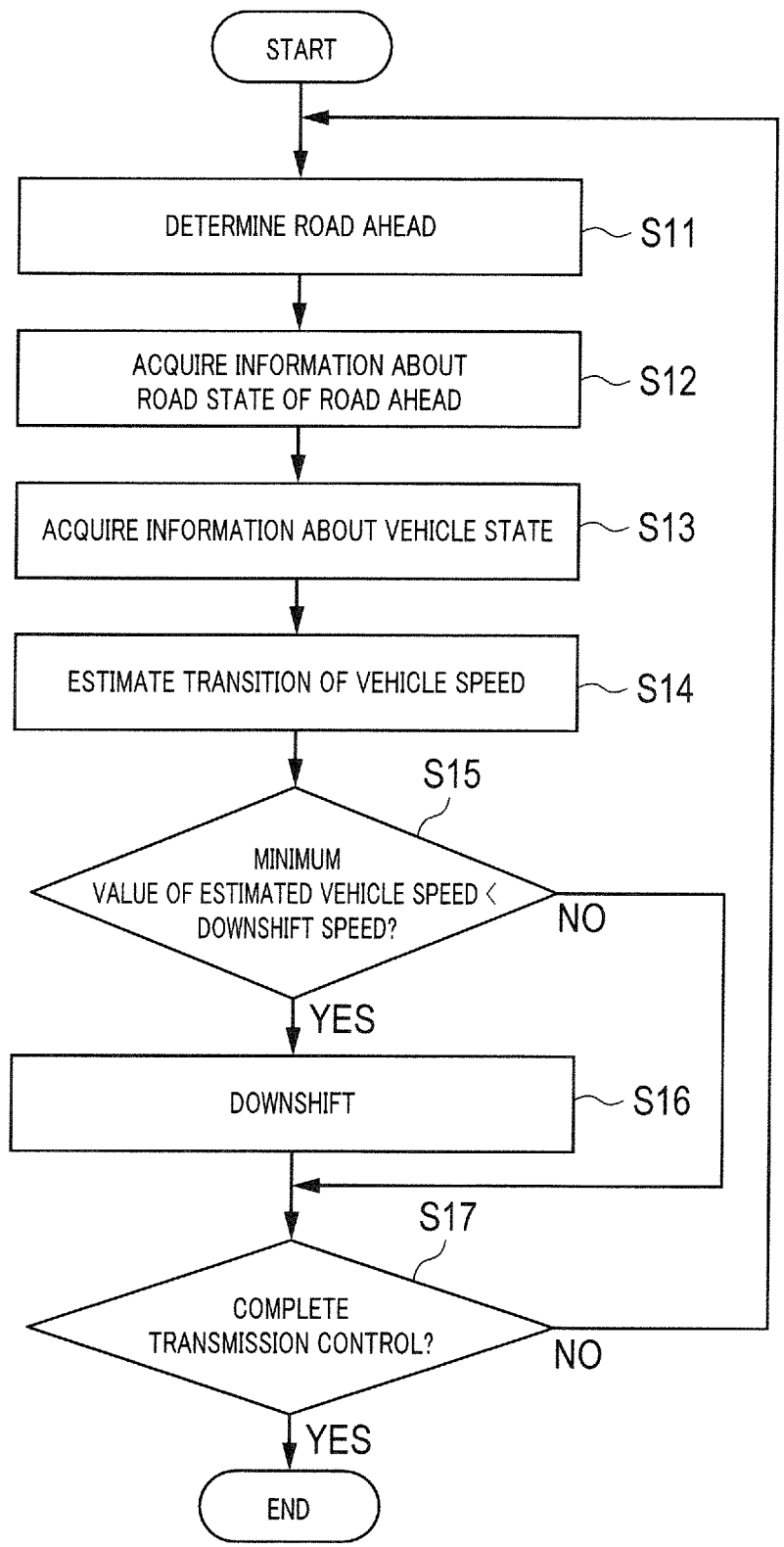
FIG. 4 is a flowchart of an example process of a travel control according to the embodiment of the present invention.

Next, an example process of the travel control according to the embodiment of the present invention is described. FIG. 4 is a flowchart of an example process of the travel control according to the embodiment of the present invention.

First, road information acquiring section 12a determines the road ahead (step S11), and acquires road information about the road ahead (step S12). Then, vehicle information acquiring section 12b acquires information about the vehicle state (step S13).

Subsequently, on the basis of the road information and the vehicle information, speed estimating section 12c estimates the transition of the vehicle speed of vehicle 1 in a predetermined section of the case where vehicle 1 travels with the present transmission gear and the maximum accelerator opening (step S14).

Next, transmission control section 12*d* determines whether the minimum value of the vehicle speed in the predetermined section estimated by speed estimating section 12*c* is smaller than the downshift vehicle speed (step S15).

Then, when the minimum value of the vehicle speed in the predetermined section is smaller than the downshift vehicle speed (YES at step S15), transmission control section 12*d* controls transmission 5 to perform a downshift from the present transmission gear to a transmission gear lower than the present transmission gear by one gear at the present position of the vehicle (step S16). With this configuration, vehicle 1 can perform a downshift before advancing to the upslope road.

After step S16, or when the minimum value of the vehicle speed in the predetermined section is not smaller than the downshift vehicle speed at step S15 (NO at step S15), transmission control section 12*d* determines whether the transmission control is to be completed without controlling transmission 5 to perform a downshift (step S17). For example, transmission control section 12*d* determines that this transmission control is to be completed when the driver has requested completion of the automatic travel.

When transmission control section 12*d* determines that the transmission control is to be completed (YES at step S17), transmission control section 12*d* completes the transmission control. When transmission control section 12*d* determines that the transmission control is not to be completed (NO at step S17), the processes subsequent to step S11 are again performed.

While speed estimating section 12*c* estimates the transition of the vehicle speed of the case where vehicle 1 travels in a predetermined section of the road ahead with the present transmission gear and the maximum accelerator opening in the embodiment of the present invention described above, the present invention is not limited to this.

For example, speed estimating section 12*c* may estimate the transition of the vehicle speed of the case where the vehicle travels with an accelerator opening equal to or greater than the current accelerator opening, not the maximum accelerator opening.

Also in this case, when the minimum value of the vehicle speed in the predetermined section estimated by speed estimating section 12*c* is smaller than the downshift vehicle speed, transmission control section 12*d* controls transmission 5 to perform a downshift from the present transmission gear to a transmission gear lower than the present transmission gear by one gear at the present position of the vehicle.

As described above, in travel control device 12 that controls a transmission to perform a downshift from a first transmission gear to a second transmission gear when a vehicle speed is lower than a predetermined speed, road information acquiring section 12*a* acquires information about a road in a predetermined section ahead of a vehicle travelling with the first transmission gear; vehicle information acquiring section 12*b* acquires information about the vehicle; speed estimating section 12*c* estimates, based on the information about the road and the information about the vehicle, a transition of a vehicle speed in the predetermined section in a case where the vehicle travels in the predetermined section with the first transmission gear; and a transmission control section controls the transmission to perform the downshift when a minimum value of the transition of the vehicle speed estimated by the speed estimating section is smaller than the predetermined speed. With this configuration, when the vehicle travels on the upslope road, it is possible to achieve prevention of reduction of the vehicle speed, prevention of degradation of fuel economy, and reduction of the period until the vehicle reaches the crest with a good balance.

In addition, in the present embodiment, the transition of the vehicle speed estimated by speed estimating section 12*c* is the transition of the vehicle speed of the case where the vehicle travels in a predetermined section with the maximum accelerator opening. With this configuration, reduction of the vehicle speed can be prevented, and the period until the vehicle reaches the crest can be further reduced.

In addition, in the present embodiment, road information acquiring section 12*a* determines the predetermined section in accordance with the present speed of the vehicle. With this configuration, the predetermined section for the vehicle speed estimation can be further appropriately changed.

This application is entitled to and claims the benefit of Japanese Patent Application No. 2015-064243 dated Mar. 26, 2015, the disclosure of which including the specification, drawings and abstract is incorporated herein by reference in its entirety.

INDUSTRIAL APPLICABILITY

The present invention is applicable to a travel control device and a travel control method for controlling a transmission to perform a downshift from a first transmission gear to a second transmission gear when the vehicle speed is lower than a predetermined speed.

REFERENCE SIGNS LIST

1 Vehicle
2 Automatic travel device
3 Engine
4 Clutch
5 Transmission
10 Engine ECU (engine control unit)
11 Power transferring ECU (power transferring control unit)
12 Automatic travel control device
12*a* Road information acquiring section
12*b* Vehicle information acquiring section
12*c* Speed estimating section
12*d* Transmission control section
13 Target-vehicle speed setting device
14 Increment/reduction value setting device
20 Road information acquiring device
30 Vehicle information acquiring device
40 Braking device

The invention claimed is:
1. A travel control device comprising:
  a vehicle information acquiring section that acquires information about a vehicle including a present vehicle speed;
  a road information acquiring section that acquires information about a road ahead of the vehicle, calculates a distance based on the product of the present vehicle speed and a predetermined time, and sets a section in the road ahead as a predetermined section, the section being from a present point to a point away from the present point by the distance;
  a speed estimating section that estimates, based on the information about the vehicle and the information about the road ahead, a transition of a vehicle speed in the predetermined section when the vehicle travels in the predetermined section in a first transmission gear; and a transmission control section that controls a transmission to perform a downshift when a minimum value of the transition of the vehicle speed estimated by the speed estimating section is less than the predetermined speed, wherein after the downshift, the road information acquiring section re-calculates a distance based on the product of the vehicle speed after the downshift and the predetermined time, and re-sets a predetermined section from a point of the vehicle after the downshift to a point away from the point of the vehicle after the downshift by the re-calculated distance; and the speed estimating section re-estimates a transition of a vehicle speed in the reset predetermined section when the vehicle travels in the reset predetermined section in a second transmission gear after the downshift.

2. The travel control device according to claim 1, wherein the transition of the vehicle speed estimated by the speed estimating section is a transition of a vehicle speed when the vehicle travels in the predetermined section with a maximum accelerator opening.

3. A travel control method comprising:

acquiring information about a vehicle including a present vehicle speed;

acquiring information about a road ahead of the vehicle;

calculating a distance based on the product of the present vehicle speed and a predetermined time;

setting a section in the road ahead as a predetermined section, the section being from a present point to a point away from the present point by the distance;

estimating, based on the information about the vehicle and the information about the road ahead, a transition of a vehicle speed in the predetermined section when the vehicle travels in the predetermined section in a first transmission gear; and controlling a transmission to perform a downshift when a minimum value of the transition of the vehicle speed estimated by the estimating is less than the predetermined speed;

re-calculating, after the downshift, a distance based on the product of the vehicle speed after the downshift and the predetermined time;

re-setting a predetermined section from a point of the vehicle after the downshift to a point away from the point of the vehicle after the downshift by the re-calculated distance; and re-estimating a transition of a vehicle speed in the reset predetermined section when the vehicle travels in the reset predetermined section in a second transmission gear after the downshift.

* * * * *